Patented Aug. 21, 1934

1,971,030

UNITED STATES PATENT OFFICE 1,971,030

CHEMICAL COMPOUND AND PRIMING MIXTURE CONTAINING THE SAME

Willi Brün, Bridgeport, Conn., assignor to Remington Arms Company, Inc., a corporation of Delaware No Drawing. Application October 19, 1931, Serial No. 569,836

10 Claims. (Cl. 52—4)

This invention relates to certain new chemical compounds which have been found to be useful as ingredients of explosive compositions, particularly ammunition priming mixtures.

The compounds are certain salts of derivatives of phthalic acid ($C_6H_4(CO_2H)_2$), particularly salts of 3-nitro-phthalic acid. 3-nitro-phthalic acid is a fairly well-known compound having the composition $C_8H_5NO_6$, which may be prepared by the nitrating of phthalic anhydride.

The present invention comprises the discovery of hitherto unknown salts of 3-nitro-phthalic acid, particularly basic lead salts thereof. Two such basic lead salts have been prepared, the analysis of which corresponds to the theoretical composition of mono-basic and di-basic salts. The mono-basic salt may be prepared substantially as follows:

First, a solution is prepared which comprises 3-nitro-phthalic acid, sodium hydroxide and water, in the proportions of 2.1 grams of 3-nitro-phthalic acid, 1.6 grams sodium hydroxide and 100 c. c. of water. Second, the aforementioned solution is dropped into a solution of lead nitrate having a concentration of 10.5 grams of lead nitrate in 100 c. c. of water. The temperature is maintained between 70° and 80° centigrade during precipitation. After the precipitation is completed the mixture is cooled and the precipitate filtered off, washed and dried. The yield of the precipitate per unit of the reacting materials is about 5.6 grams. The new salt thus secured has a lead content of 63.67%, corresponding quite closely to the 63.04% which is the theoretical lead content of mono-basic lead 3-nitro phthalate, having the probable formula

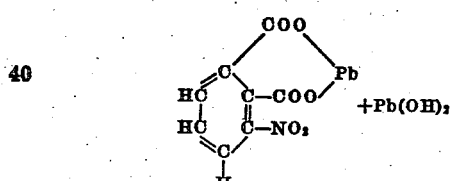

Di-basic lead 3-nitro-phthalate has been prepared as follows:

A solution of the proportions of 2.1 grams of 3-nitro-phthalic acid and 2.4 grams sodium hydroxide in 100 c. c. of water is dropped into a solution of 15 grams of lead nitrate in 100 c. c. of water. Just as in the preparation of the mono-basic salt the temperature is maintained between 70° and 80° centigrade during precipitation; and the mixture is then cooled, the precipitate filtered off, washed and dried. Unit quantities of the reacting ingredients yield 9.8 grams of a salt having a lead content of 68.49% which approximates the theoretical lead content, 69.17%, of di-basic lead 3-nitro-phthalate of the formula:

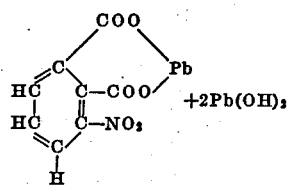

Both of these basic lead salts of 3-nitro-phthalic acid are believed to be novel substances. They have been found highly useful as ingredients of explosive compositions, particularly ammunition priming compositions in which they are used as fuels in conjunction with suitable oxidizers and combustion initiators. Typical priming mixtures embodying them are as follows:

| | Per cent |
|---|---|
| Mercury fulminate | Approximately 40 |
| Barium nitrate | 25 to 30 |
| Mono-basic or di-basic lead 3-nitro-phthalate | 7 to 12 |
| Abrasive material such as glass | 20 to 25 |

A sample of a non-mercuric, rim-fire mixture:

| | Per cent |
|---|---|
| Tetracene | 1 to 5 |
| Lead styphnate | 20 to 50 |
| Lead nitrate | 15 to 35 |
| Mono or di-basic lead 3-nitro-phthalate | 5 to 10 |
| Glass or another abrasive material | 15 to 25 |

A sample of a center-fire mixture:

| | Per cent |
|---|---|
| Mercury fulminate | 0 to 50 |
| Lead styphnate | 0 to 50 |
| Antimony sulphide | 5 to 15 |
| Calcium silicide | 3 to 12 |
| Barium nitrate | 25 to 50 |
| Mono or di-basic lead 3-nitro-phthalate | 5 to 20 |

The term "tetracene" as used above is to be understood as including guanylnitrosaminoguanyltetracene and such other compounds as fall within the definition of a "tetracene" given in the patent to Rathsburg, No. 1,586,380, May 25, 1926.

The mixtures included in the foregoing tables are merely typical ones, the present invention contemplating the use of the newly discovered salts in priming mixtures generally, as well as for other purposes. The salts themselves being entirely novel, the appended claims are to be broadly construed.

What is claimed is:

1. A basic lead salt of 3-nitro phthalic acid.
2. The mono-basic lead 3-nitro phthalate of the composition $$C_6H_3NO_2(COO)_2Pb \cdot Pb(OH)_2.$$

3. The di-basic lead 3-nitro phthlate of the composition $$C_6H_3NO_2(COO)_2Pb \cdot 2(Pb(OH)_2).$$

4. An ammunition priming mixture containing a basic lead salt of 3-nitro phthalic acid.
5. An ammunition priming mixture containing a basic lead salt of 3-nitro phthalic acid, an oxidizing ingredient, and a combustion initiating ingredient.
6. The method of making lead salts of 3-nitro phthalic acid which comprises the addition to an aqueous solution of lead nitrate of an aqueous solution containing 3-nitro phthalic acid and sodium hydroxide in suitable proportions; at a temperature approximating 70° or 80° centigrade, maintaining said temperature during precipitation; and the recovery of the resulting precipitate.
7. The method of making the mono-basic lead salt of 3-nitro phthalic acid which comprises the addition to a solution of 10.5 grams of lead nitrate in 100 c. c. of water of a solution of 2.1 grams of 3-nitro phthalic acid and 1.6 grams sodium hydroxide in 100 c. c. of water at a temperature approximating 70° or 80° centigrade; and the recovery of the resulting precipitate.
8. The method of making the di-basic lead salt of 3-nitro phthalic acid which comprises the addition to a solution of 15 grams of lead nitrate in 100 c. c. of water of a solution of 2.1 grams of 3-nitro phthalic acid and 2.4 grams sodium hydroxide in 100 c. c. of water at a temperature approximating 70° or 80° centigrade; and the recovery of the resulting precipitate.
9. A priming mixture for ammunition containing a basic lead salt of 3-nitro phthalic acid, and lead styphnate.
10. A priming mixture for ammunition containing a basic lead salt of 3-nitro phthalic acid, lead styphnate, and lead nitrate.

WILLI BRÜN.